(12) United States Patent
Rawat et al.

(10) Patent No.: US 11,468,676 B2
(45) Date of Patent: Oct. 11, 2022

(54) METHODS OF REAL-TIME SPATIO-TEMPORAL ACTIVITY DETECTION AND CATEGORIZATION FROM UNTRIMMED VIDEO SEGMENTS

(71) Applicant: University of Central Florida Research Foundation, Inc., Orlando, FL (US)

(72) Inventors: Yogesh Singh Rawat, Orlando, FL (US); Mubarak Shah, Orlando, FL (US); Aayush Jung Bahadur Rana, Orlando, FL (US); Praveen Tirupattur, Orlando, FL (US); Mamshad Nayeem Rizve, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 17/647,415

(22) Filed: Jan. 7, 2022

(65) Prior Publication Data
US 2022/0222940 A1 Jul. 14, 2022

Related U.S. Application Data

(60) Provisional application No. 63/199,568, filed on Jan. 8, 2021.

(51) Int. Cl.
*G06V 20/40* (2022.01)
(52) U.S. Cl.
CPC .............. *G06V 20/41* (2022.01); *G06V 20/46* (2022.01); *G06V 20/49* (2022.01)

(58) Field of Classification Search
None
See application file for complete search history.

(56) References Cited

U.S. PATENT DOCUMENTS 8,218,819 B2  7/2012  Cobb et al.
8,949,235 B2  2/2015  Peleg et al.
(Continued)

OTHER PUBLICATIONS

Chen et al., Rethinking atrous convolution for semantic image segmentation. 2017. arXiv preprint arXiv:1706.05587.
(Continued)

*Primary Examiner* — Santiago Garcia
(74) *Attorney, Agent, or Firm* — Andriy Lytvyn; Paul Murty; Smith & Hopen, P.A.

(57) ABSTRACT

Methods of detecting and categorizing an action in an untrimmed video segment regardless of the scale of the action and the close proximity of other actions. The methods improve upon the prior art which either require trimmed video segments including only a single activity depicted therein, or untrimmed video segments including relatively few actions, persons, or objects of interest, thereby directing the classification. Instead, the methods utilize a plurality of tubelets used to represent discreet actions, persons, and objects of interest within the comprehensive untrimmed video segment. The tubelets are localized to correct for pixel-level foreground-background biases, which are then turned into short spatio-temporal action tubelets that are passed to a classification network to obtain multi-label predictions. After classification, the tubelets are be linked together to obtain the final detections with varying lengths, and the method merges the short action tubelets into final action detections.

18 Claims, 12 Drawing Sheets

(56) References Cited

U.S. PATENT DOCUMENTS

| | | | |
|---|---|---|---|
| 10,997,433 B2* | 5/2021 | Xu | G05D 1/0088 |
| 2016/0323658 A1 | 11/2016 | Richardson | |
| 2021/0064883 A1* | 3/2021 | Sharma | G06N 3/088 |
| 2021/0307621 A1* | 10/2021 | Svenson | G06V 40/174 |
| 2022/0058394 A1* | 2/2022 | Tang | G08B 13/19673 |
| 2022/0059132 A1* | 2/2022 | Sun | G06V 20/47 |
| 2022/0067383 A1* | 3/2022 | Hu | G06K 9/629 |
| 2022/0070453 A1* | 3/2022 | Tang | H04N 19/114 |

OTHER PUBLICATIONS

Kirillov et al., Panoptic feature pyramid networks. Proceedings of the IEEE Conference on Computer Vision and Pattern Recognition. 2019: 6399-6408.

Ronneberger et al., U-net: Convolutional networks for biomedical image segmentation. Medical Image Computing and Computer-Assisted Intervention (MICCAI). Part III. LNCS 2015. vol. 9351: 234-241.

Tran et al., A closer look at spatiotemporal convolutions for action recognition. Proceedings of the IEEE conference on Computer Vision and Pattern Recognition. 2018: 6450-6459.

Wu et al., Optimizing connected component labeling algorithms. Medical Imaging 2005: Image Processing. 2005. vol. 5747: 1965-1976.

\* cited by examiner

METHODS OF REAL-TIME SPATIO-TEMPORAL ACTIVITY DETECTION AND CATEGORIZATION FROM UNTRIMMED VIDEO SEGMENTS

CROSS-REFERENCE TO RELATED APPLICATIONS

This nonprovisional application claims priority to provisional application No. 63/199,568, entitled "Methods of real-time spatio-temporal activity detection and categorization from untrimmed video segments," filed on Jan. 8, 2021 by the same inventors, the entirety of which is incorporated herein by reference.

FEDERALLY SPONSORED RESEARCH OR DEVELOPMENT

This invention was made with Government support under Grant No. D17PC00345 awarded by the Intelligence Advanced Research Projects Activity (IARPA). The government has certain rights in the invention.

BACKGROUND OF THE INVENTION

1. Field of the Invention

This invention relates, generally, to methods of detecting objects and actions of interest within a video segment. More specifically, it relates to robust and comprehensive methods of real-time spatio-temporal activity detection usable on untrimmed video segments to detect and categorize foreground and background persons, objects, activities, and other categories of interest.

2. Brief Description of the Prior Art

Categorization of activities, persons, and objects within a video segment is a growing field that until recently required extensive human interaction to ensure accuracy. As technology advances and recording devices become more prevalent, the capability of such devices to convey useful information to stakeholders is paramount to improving video analyses, particularly through the identification and highlighting of noteworthy events within a video segment, as well as resolving previously undetected activities within a given area of interest captured across one or more frames of video. For example, law enforcement personnel can review video data captured by a security camera when piecing together information related to an area of interest. In addition, sports coaches can review video for identifiable traits while analyzing strengths and weaknesses of teams and/or players. However, due to recent technological advances, the process of categorizing activities of interest in a video segment is becoming more automated, without requiring as much human interaction.

Machine learning techniques used to train data sets to automatically detect certain trained activities, such as the use of deep convolutional neural networks, have achieved impressive action classification results in recent years [3], [31], [32]. Similar advancements have been made for the tasks of action detection in trimmed videos (videos in which a singular activity is depicted) [6], [15], [29], where the spatial extents of the actions are estimated, as well as temporal action localization in untrimmed videos (videos in which multiple activities are depicted without a singular focus) [23], [35], where only the temporal extents, or timings, of the activities are predicted. However, these improvements have not been transferred to action detection in untrimmed videos, where both the spatial and temporal extents of the activities must be found.

Action detection in untrimmed videos presents several major challenges, making automation of such action detection extremely difficult. For example, multiple activity types may occur simultaneously, multiple actors may be present within a video segment, or the temporal extents of the activities may be unknown. Videos in trimmed action detection datasets, such as the AVA dataset [11], contain multiple actors and activities simultaneously; however, each video is trimmed into smaller segments, such as three-second clips in the AVA set, which include bounding-box annotations only on the central frame of each clip. As such, the usefulness of such trained datasets is severely limited by the limitations of the datasets themselves, leading to inaccurate classification. In addition, untrimmed action detection datasets, such as the THUMOS' 14 dataset [14], include untrimmed videos but are limited to including only one or two actors performing the same action. As such, the limited actions may result in accurate categorizations for the selected actions within the set, but activities outside of the scope of the very limited trained dataset result in inaccurate categorizations since no training is performed beyond the singular action.

Datasets including untrimmed videos including multiple actors and activities, such as those provided in the VIRAT [21] and MEVA [1] datasets, thereby provide more useful information for the ultimate categorization of spatio-temporal actions, persons, and objects. Such datasets also include multiple viewpoints and contain several actors of varying scales and sizes relative to the video frame performing multiple actions concurrently. A comparison of such datasets to more traditional limited datasets is shown in FIG. 1, with the more comprehensive datasets shown in the top two images, and the more limited datasets shown in the bottom two images However, the less focused a dataset, the more difficult activity categorization becomes, since spatial relationships, actions performed in close proximity, and relative sizes scaling risks certain actions, persons, or objects not being accurately categorized during analysis.

Accordingly, what is needed is an improved method of categorizing spatio-temporal actions, persons, and objects of interest within an untrimmed video using a comprehensive dataset. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a method of detecting and categorizing a plurality of actions from an untrimmed video segment is now met by a new, useful, and nonobvious invention.

An embodiment of the novel method includes a step of receiving an untrimmed video segment including a plurality of subsequent frames. The untrimmed video segment includes one or more activities depicted therein. The untrimmed video segment is split into a plurality of video clips, with each of the plurality of video clips including at least one of the plurality of subsequent frames. For each of the plurality of video clips, a localization network localizes each of the one or more activities depicted in the video clip by placing a bounding box over each of the one or more activities in a first of the plurality of subsequent frames and tracking the bounding box across a remainder of the plurality of subsequent frames, such that one or more bounding boxes are generated.

After performing the localization for each of the plurality of video clips, the method includes a step of outputting, for each of the plurality of video clips, a segmentation mask by assigning, for each pixel of each of the plurality of subsequent frames, a probability of depicting the one or more activities, the probability being based on a location of the pixel to the one or more bounding boxes. Based on the segmentation mask, the method includes a step of calculating, for each of the plurality of video clips, a foreground-background confidence mask that differentiates between the one or more activities and a background.

Based on the foreground-background confidence mask, a plurality of candidate tubelets that correlate with the one or more bounding boxes are extracted. The plurality of candidate tubelets are simultaneously filtered and combined into an output of action-specific tubes, with each action-specific tube including a portion of the plurality of candidate tubelets and being greater in length then each of the plurality of candidate tubelets. The plurality of candidate tubelets are merged into a set of action-agnostic tubes that are discrete based on an overlap on a position grad with one of the one or more bounding boxes across the plurality of subsequent frames. The set of action-agnostic tubes are split into a set of actions-specific tubes by classifying each of the one or more activities contained within each action-agnostic tube.

An embodiment of the novel method includes a step of capturing, via a recording device having a storage medium associated therewith, an untrimmed video segment including a plurality of subsequent frames. The untrimmed video segment includes one or more activities depicted therein. A remote computing device including a processor and a non-transitory storage medium receives the untrimmed video segment from the recording device, such that the untrimmed video segment is stored on the non-transitory storage medium. The processor of the remote computing device splits the untrimmed video segment into a plurality of video clips, with each of the plurality of video clips including at least one of the plurality of subsequent frames.

For each of the plurality of video clips, the method includes a step of localizing, via a localization network executable on the remote computing device, each of the one or more activities depicted in the video clip by placing a bounding box over each of the one or more activities in a first of the plurality of subsequent frames and tracking the bounding box across a remainder of the plurality of subsequent frames, such that one or more bounding boxes are generated. After performing the localization for each of the plurality of video clips, the method includes a step of outputting, for each of the plurality of video clips, a segmentation mask by assigning, for each pixel of each of the plurality of subsequent frames, a probability of depicting the one or more activities, the probability based on a location of the pixel to the one or more bounding boxes.

Based on the segmentation mask, the remote computing device calculates, for each of the plurality of video clips, a foreground-background confidence mask that differentiates between the one or more activities and a background. Based on the foreground-background confidence mask, a plurality of candidate tubelets are extracted that correlate with the one or more bounding boxes. The plurality of candidate tubelets are simultaneously filtered and combined into an output of action-specific tubes, each action-specific tube including a portion of the plurality of candidate tubelets and being greater in length then each of the plurality of candidate tubelets. The plurality of candidate tubelets are merged into a set of action-agnostic tubes that are discrete based on an overlap on a position grad with one of the one or more bounding boxes across the plurality of subsequent frames. The set of action-agnostic tubes are split into a set of actions-specific tubes by classifying each of the one or more activities contained within each action-agnostic tube.

An embodiment of the novel method includes a step of localizing, via a localization network, each of one or more activities depicted in the untrimmed video segment having a plurality of subsequent frames by placing a bounding box over each of the one or more activities in a first of the plurality of subsequent frames and tracking the bounding box across a remainder of the plurality of subsequent frames, such that one or more bounding boxes are generated. After performing the localization for each of the plurality of video clips, a segmentation mask is outputted by assigning, for each pixel of each of the plurality of subsequent frames, a probability of depicting the one or more activities.

To assign the probability, the method includes a step of calculating a binary cross-entropy loss for each pixel of each of the plurality of subsequent frames. A patch-dice loss is calculated by splitting each of the plurality of subsequent frames into a plurality of local neighborhoods based on a position grid and computing a dice loss for each of the plurality of local neighborhoods. A weighted sum of the binary cross-entropy loss and the patch-dice loss is calculated, and, based on the weighted sum, a foreground-background confidence mask that differentiates between the one or more activities and a background is outputted. The probability of depicting the one or more activities is based on a location of the pixel to the one or more bounding boxes on the position grid.

Based on the foreground-background confidence mask, a plurality of candidate tubelets are extracted that correlate with the one or more bounding boxes. The plurality of candidate tubelets are simultaneously filtered and combined into an output of action-specific tubes, each action-specific tube including a portion of the plurality of candidate tubelets and being greater in length then each of the plurality of candidate tubelets. The plurality of candidate tubelets are merged into a set of action-agnostic tubes that are discrete based on an overlap on a position grad with one of the one or more bounding boxes across the plurality of subsequent frames. The set of action-agnostic tubes are split into a set of actions-specific tubes by classifying each of the one or more activities contained within each action-agnostic tube.

The set of action-agnostic tubes from the plurality of candidate tubelets is created by: 1) creating a new action-agnostic tube based on a determination that one of the plurality of candidate tubelets does not overlap with any remaining candidate tubelets on the position grid; 2) merging one of the plurality of candidate tubelets with an action-agnostic tube based on a determination that the one of the plurality of candidate tubelets overlaps with the action-agnostic tube on the position grid; 3) creating a new action-agnostic tube based on a determination that one of the plurality of candidate tubelets overlaps with two or more discrete tubelets of the plurality of candidate tubelets; and 4) based on a determination that two or more of the plurality of candidate tubelets overlaps with an action-agnostic tube, merging the candidate tubelet having a higher overlap with the action-agnostic tube on the position grid, and creating a new action-agnostic tube based on the other candidate tubelet of the plurality of candidate tubelets.

An object of the invention is to provide a computationally-efficient and accurate method of categorizing many different actions, persons, and objects within an untrimmed video segment, which is not directed to any singular action, person, or object, thereby providing a comprehensive method of activity detection and categorization.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 3A depicts a first process associated with a method of activity detection and categorization from a plurality of tubelets derived from an untrimmed video segment, resulting in a plurality of action-agnostic tubes, in accordance with an embodiment of the present invention.

FIG. 3B depicts a second process associated with the method of activity detection and categorization of FIG. 3A, including steps of converting the plurality of action-agnostic tubes into action-specific predictions.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes methods of detecting and categorizing an action in an untrimmed video segment regardless of the scale of the action and the close proximity of other actions. The methods improve upon the prior art which either require trimmed video segments including only a single activity depicted therein, or untrimmed video segments including relatively few actions, persons, or objects of interest, thereby directing the classification. Instead, the methods utilize a plurality of tubelets used to represent discreet actions, persons, and objects of interest within the comprehensive untrimmed video segment. The tubelets are localized to correct for pixel-level foreground-background biases, which are then turned into short spatio-temporal action tubelets that are passed to a classification network to obtain multi-label predictions. After classification, the tubelets are be linked together to obtain the final detections with varying lengths, and the method merges the short action tubelets into final action detections. The methods of detecting and categorizing an action in an untrimmed video segment will be described in greater detail herein below.

Figure 1:
FIG. 1 depicts a comparison between comprehensive untrimmed video datasets (the top two images) and trimmed video datasets (the bottom left image) or untrimmed, limited video datasets (bottom right image).
Figure 2A:
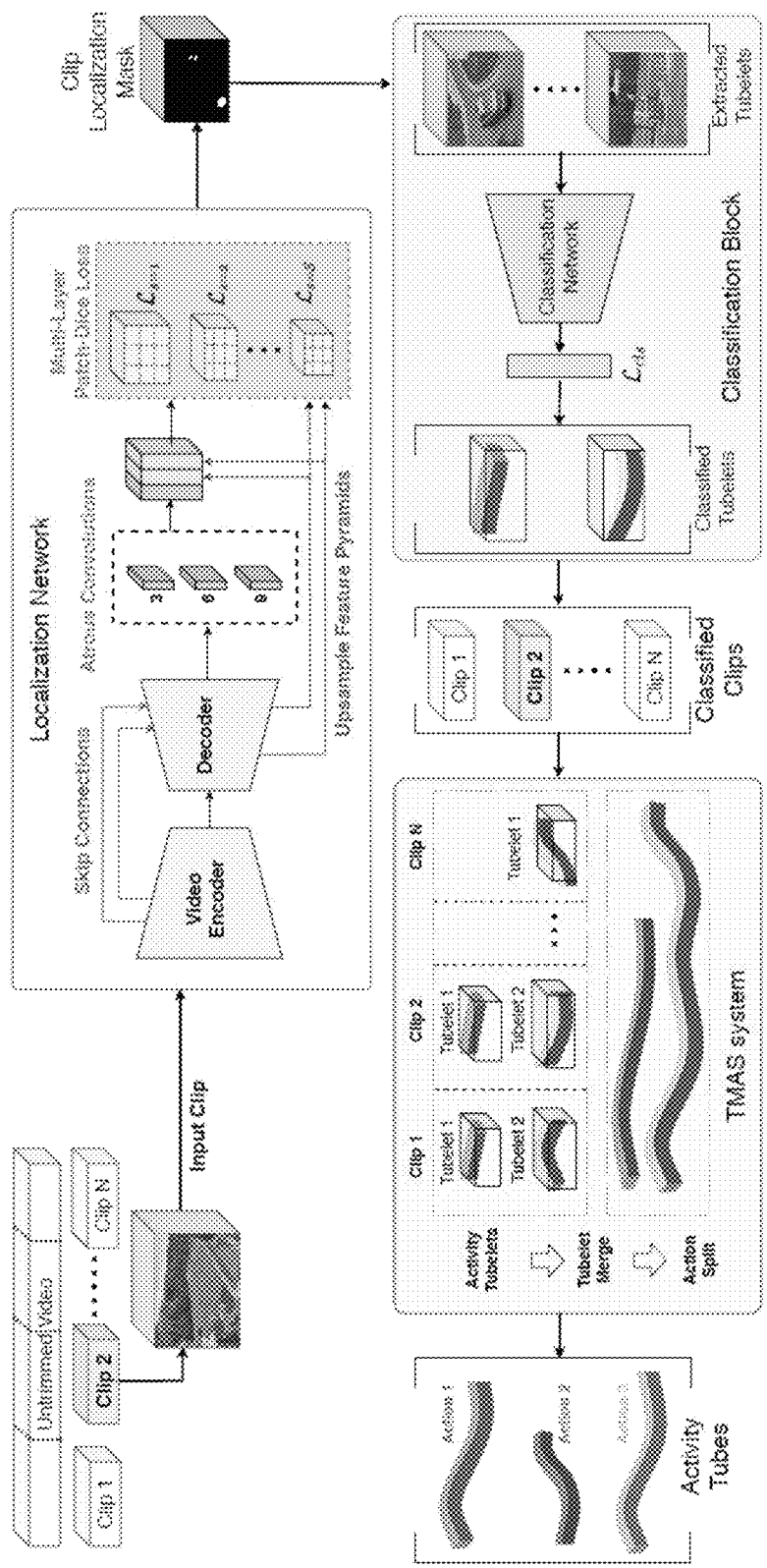
FIG. 2A is a schematic overview showing a method of detecting and categorizing an action in an untrimmed video segment, in accordance with an embodiment of the present invention.
Figure 2B:
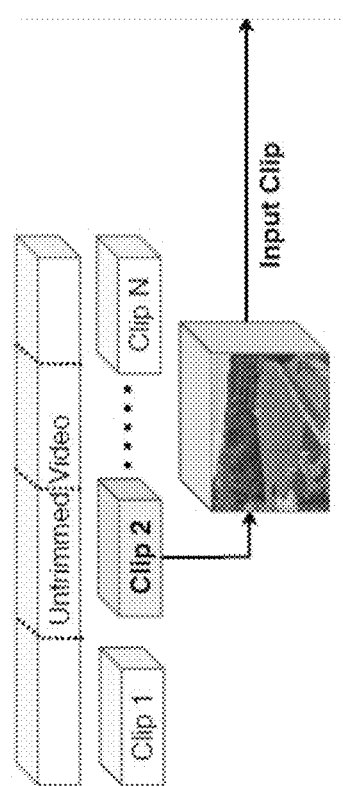
FIG. 2B is a close-up view of the segmentation of the untrimmed video segment of FIG. 2A, showing a step of dividing the video segment into a plurality of clips.
Figure 2C:
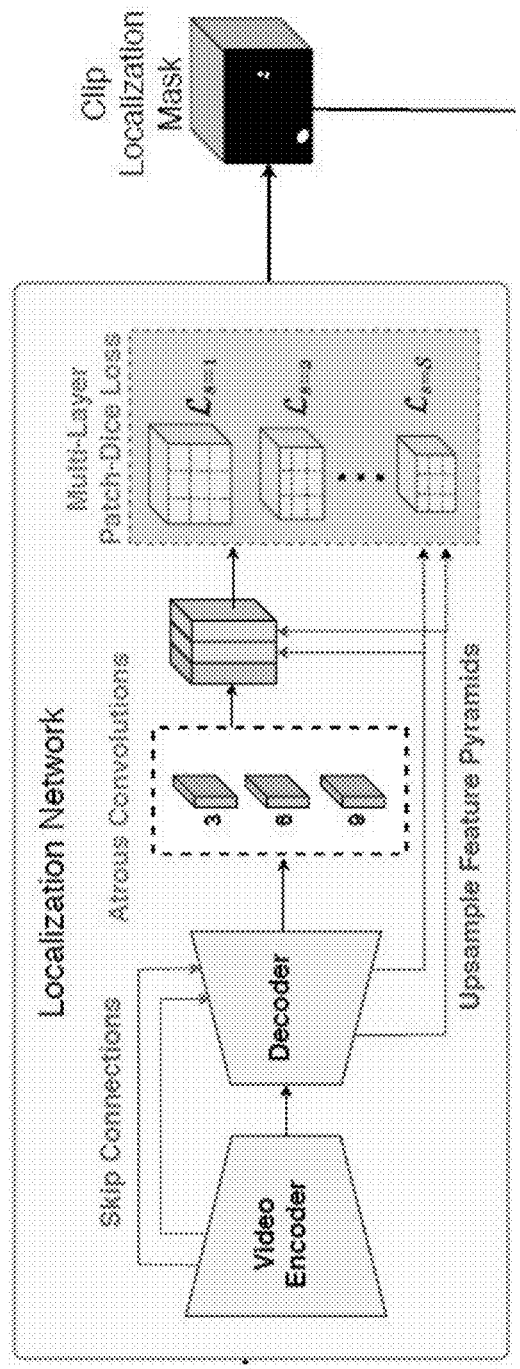
FIG. 2C is a close-up view of the localization of a single clip of the plurality of clips of FIG. 2B.
Figure 2D:
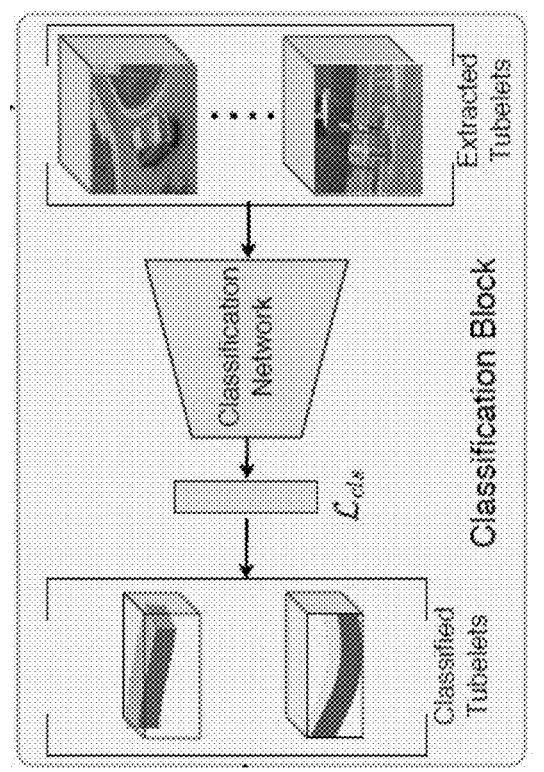
FIG. 2D is a close-up view of data extraction and an initial classification of the localized clip of FIG. 2C.
Figure 2E:
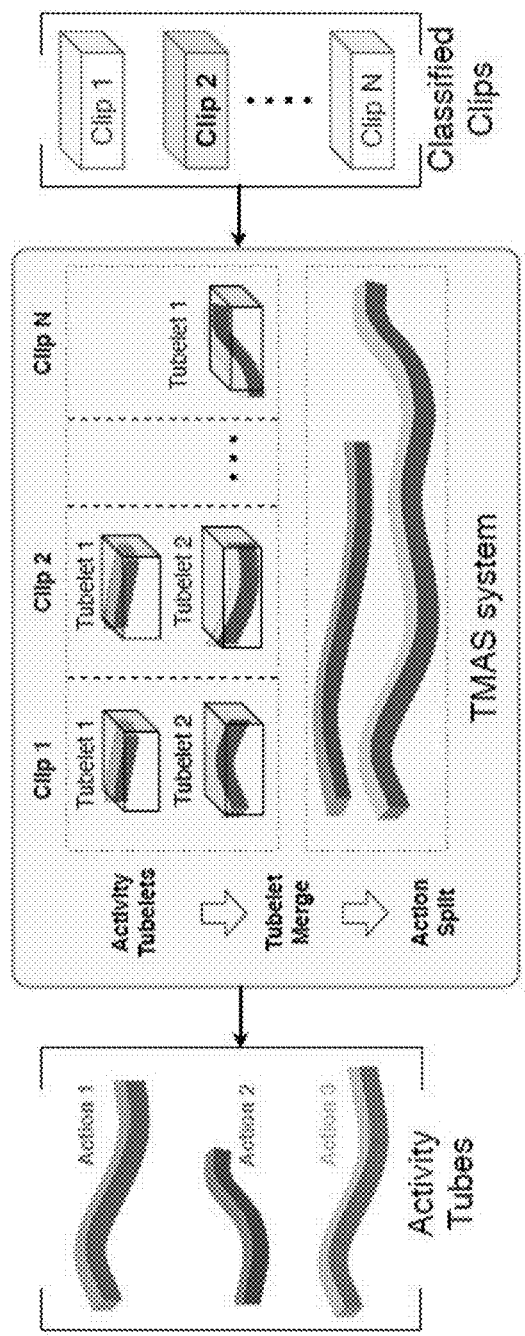
FIG. 2E is a close-up view of the steps associated with a final clip classification for each spatio-temporal action depicted in the untrimmed video segment of FIG. 2A.

FIG. 2A depicts an overview of an embodiment of the classification method, with FIGS. 2B-2E providing close-up, in-depth views of individual components of the method. As shown in FIGS. 2A-2E, the method includes the capturing of an untrimmed video segment via a recording device having a temporary or permanent storage medium, such as a camera to capture a plurality of frames of video. A remote computing device including a processor and a non-transitory storage medium receives the plurality of frames of video from the recording device, with the plurality of frames of video being stored on the non-transitory storage medium.

After being received by the remote computing device, each untrimmed video, including a plurality of frames of video, is first split into smaller video clips by the processor of the remote computing device. The video clips are each passed to a localization network to localize potential action tubelets that are each related to a single activity that is identified within each clip, with each activity being tracked across subsequent frames of video and across subsequent video clips. As such, each video clip is processed by the localization network that localizes all actions that occur within the video clip, such that a bounding box is placed over each identified action occurring within each video clip, tracking across subsequent frames. Each tubelet which represents an identified action, denoted $\tau_i$, is described as $(f_1^i, f_2^i, b^i, a_c^i)$ where $f_1^i$ is the start time, $f_2^i$ is the end time, $b^i$ represents the bounding boxes for each from of the tubelet, and $a_c^i$ denotes the frame-level action probability $c \in \{0, 1, \ldots C\}$, where 0 is the background.

To perform the localization of each video clip, the method uses an encoder-decoder structure (such as a 3D convolution-based encoder, e.g. I3D [3]) which extracts class-agnostic action features (such as spatio-temporal features that are required for activity localization) and generates segmentation masks for each clip. The decoder uses these features to segment regions from the original input which contain activities. In an embodiment, the decoder combines transpose convolutions and up-sampling for each clip; however, since stacking transpose convolution layers is computationally intensive, the method improves computational efficiency by interleaving up-sampling operations to interpolate features. In such embodiments, the resulting localization network includes a shallow decoder network, thereby preventing over-parameterization and avoiding overfitting of the data.

The localization network leverages skip connections [27], feature pyramids [19] and atrous convolutions [4]. The decoder's input features are down-sampled by the encoder, and fine-grained segmentations are obtained using skip connections from higher resolution layers of the encoders. Moreover, since most video clips include actions that vary in scale, the decoder utilizes feature pyramids by stacking features from various decoder layers (through up-sampling) to obtain feature representations at different scales. In addition, atrous convolutions are applied to the final feature representation of the decoder, thereby allowing the decoder to learn the contextual information necessary for action localization.

The final output of the localization network is a segmentation mask $\hat{y}$, where each pixel is assigned a probability of being a part of an action within the clip. Given the ground-truth foreground/background mask, y, the network is trained end-to-end using a sum of two losses. The first is the binary cross-entropy (BCE) loss calculation:

$$\mathcal{L}_{BCE}(y, \hat{y}) = -\frac{1}{N}\sum_{i=1}^{N}[y_i \log(\hat{y}_i) + (1-y_i)\log(1-\hat{y}_i)] \quad (1)$$

that is computed over all N pixels for each clip. Since the actors and/or actions tend to be small in size within untrimmed video segments, such as security videos, there is a large imbalance between the number of foreground and background pixels, which causes BCE to miss-localize some actions. A standard approach to remedy this is to use Dice loss [30]; however, a large variation in scale between different foreground objects (actors and/or actions) is found, leading the network to focus on the larger actions and ignore smaller actions. As such, the method employs a novel Patch-Dice Loss (PDL) calculation:

$$\mathcal{L}_{PDL}(y, \hat{y}) = \sum_{k=1}^{K}\left(1 - \frac{2\sum_{i=1}^{M}p_{k,i} * \hat{p}_{k,i}}{\sum_{i=1}^{M}p_{k,i}^2 + \sum_{i=1}^{M}\hat{p}_{k,i}^2 + \epsilon}\right) \quad (2)$$

where K is the number of patches, M is the number of pixels per patch, and $p_{k,i}$ denotes the probability value assigned to pixel i in patch k. This loss splits each frame into many local neighborhoods (patches), and computes the dice loss on each patch, thereby forcing the network to segment actions of any size. The final loss is calculated as a weighted sum of BCE and PDL over multiple scales:

$$\mathcal{L}_{loc} = \sum_{s=1}^{S}\lambda_1\mathcal{L}_{BCE}(y^{(s)}, \hat{y}^{(s)}) + \lambda_2\mathcal{L}_{PDL}(y^{(s)}, \hat{y}^{(s)}) \quad (3)$$

where S denotes the number of layers, and for a layer s, $y^{(s)}$ and $\hat{y}^{(s)}$ are the ground-truth and predicted segmentations, respectively.

The segmentation output for each video clip is a foreground-background confidence mask, which isolates potential action tubes within the clip based on overlapping grid positions of the potential action tubes across subsequent frames of a video clip, as well as across subsequent video clips. To obtain individual tubelets from this segmentation output, the method thresholds the output to create a binary mask, followed by spatio-temporal connected component extraction. The connected component [8], [33] process generates tubelets for all spatially and temporally linked pixels based on the grid positions across frames and/or clips. In an embodiment, the tubelets are approximately 1 second in length with approximately 32 frames; however, it should be appreciated that longer and shorter tubelets (both in temporal length and in total frames) can be identified based on a length of a tracked activity, and that tubelets can be connected across subsequent clips and include more than 32 frames.

Once the tubelets are extracted, the method classifies all possible action classes present within each tubelet. The classification network is an R(2+1)D network [32] that generates C+1 probability outputs, where C denotes the number of action classes, and the additional output is used for the background class in situations in which no action is present in the tubelet. Since multiple actions can occur simultaneously in one tube and must be classified individually, the method compensates for the potential error. Instead of using a softmax activation for the probability outputs, which is common for single-label action classifiers, a sigmoid activation is used, allowing multiple actions to be classified within a single tubelet. To train this classifier, a BCE loss (equation 1) is used, summed over all C+1 probability outputs.

Figure 3A:
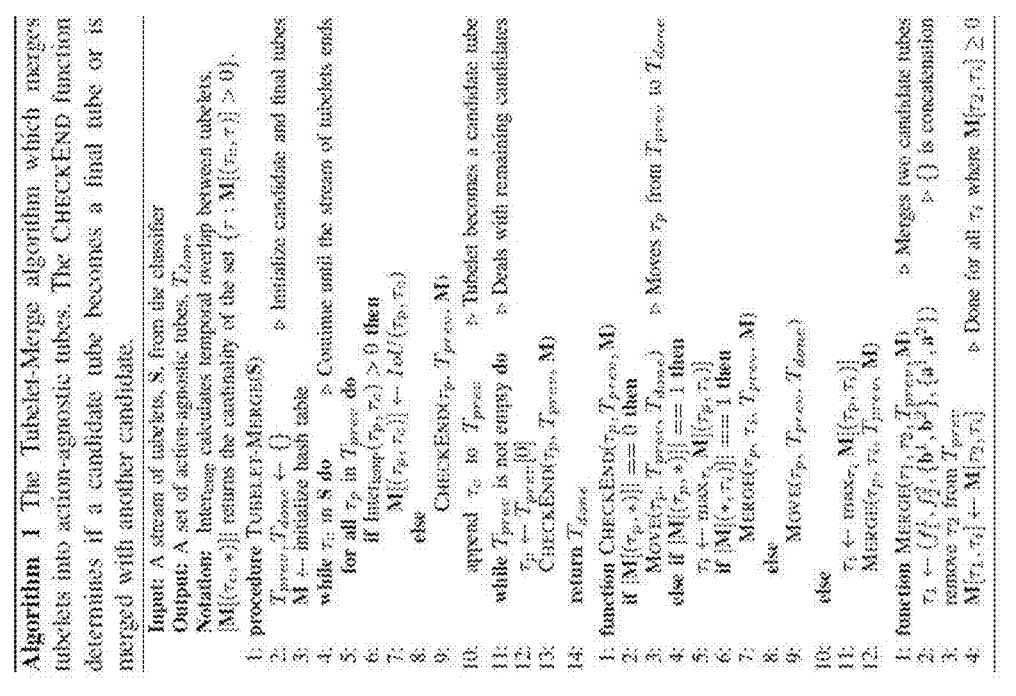
Figure 3B:
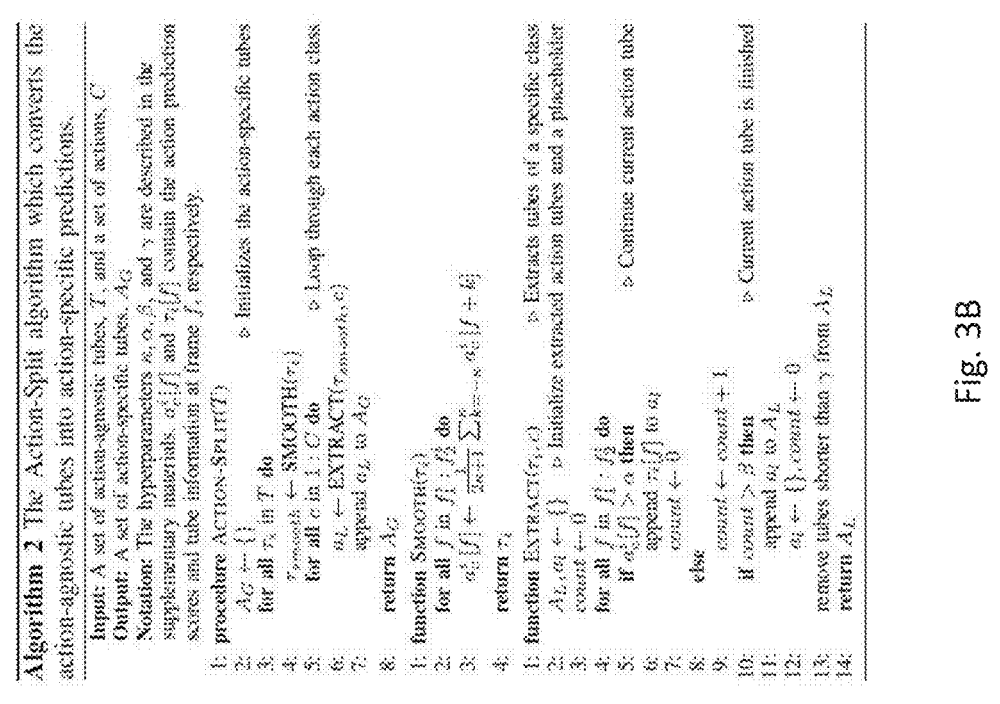

Finally, the method and system simultaneously filter and combine these short tubelets from the localization and classification steps into longer action tubes using a two-step calculation, which is shown in FIGS. 3A-3B in greater detail. The first step, depicted in FIG. 3A, includes calculations to merge the tubelets; the second step, depicted in FIG. 3B, includes calculations to split the actions into different categories. As such, the overall two-step calculation may be referred to as a tubelet-merge action-split (TMAS) calculation. The calculations will be discussed in greater detail in the sections below.

As noted above, during classification, each tubelet, denoted $\tau_i$, is described as $(f_1^i, f_2^i, b^i, a_c^i)$ where $f_1^i$ is the start time, $f_2^i$ is the end time, $b^i$ represents the bounding boxes for each from of the tubelet, and $a_c^i$ denotes the frame-level action probability $c \in \{0, 1, \ldots C\}$, where 0 is the background. During the first of the two steps, the tubelets are merged into action-agnostic tubes of varying length; next, the action-agnostic tubes are split into a set of action-specific tubes containing the localizations for the various activities in the video clip.

As shown in FIG. 3A, the procedure to merge tubelets into action-agnostic tubes includes an input of a temporally sequential stream of tubelets from the classification network, described in detail above. The set of candidate tubes is initialized with the first tubelet. For each subsequent tubelet, the spatio-temporal overlap is calculated with the existing candidate tubes, resulting in four possible outcomes: 1) if there is no overlap, the tubelet becomes a new candidate tube; 2) if there is overlap between a single candidate tube and the tubelet, they are merged and become a new candidate tube; 3) if the tubelet has an overlap with multiple candidates, then the tubelet becomes a new candidate; and 4) if multiple tubelets have an overlap with a single candidate tube, then the tubelet with the highest overlap is merged with that candidate and the other tubelets become separate candidate tubes, thereby ensuring that activities, actions, actors, and/or object are consistently tracked across frames and/or clips. Once all tubelets are checked, the candidate tubes become the output action-agnostic tubes.

Next, as shown in FIG. 3B, action-specific detections are obtained from the action-agnostic tubes described in FIG. 3A. The per-frame action confidence scores are smoothed out based on a moving average of tubelet overlap across subsequent frames and/or clips, accounting for fragmentation caused by action miss-classifications, such as a missing action in a single frame between identified tubelets in other frames. Such a moving average of tubelets allows for the smoothing of tubelets across temporarily missing actions in individual frames, thereby ensuring that the method tracks tubelets based on predicted outcomes as well as identified positions. Then, the action-specific tubes are built by checking for continuous occurrences of each action class; this allows several occurrences of the same activity to occur within a single tube. For instance, a person walking might stop and stand for several seconds and start walking again; this entire sequence will be contained in a single tube, but the Action-Split procedure shown in FIG. 3B correctly generates two separate instances of activity_walking and one instance of activity_standing. To be robust to classification errors, action tubes with the same action label that are within a limited temporal neighborhood are combined together to form a single continuous action prediction.

The worst-case runtime of the two-step method described above is $O(n^2)$, where n is the total number of candidate tubes at any given time. However, the tubelets are sequentially processed, and the method constantly shifts the candidate tubes that cannot have any possible future matches to the final set of tubes. As such, the set of candidate tubes at any particular time is reasonably small and the two-step method contributes negligible overhead to the system's overall computation time. Accordingly, the method's removal of candidate tubes without subsequent matches from the ongoing calculations improves the computational efficiencies related to tracking each identified tubelet.

Experimental Results

The method described above was evaluated on two large-scale action detection datasets including untrimmed security videos: VIRAT and MEVA, discussed above. The first dataset consists of videos from the VIRAT [21] dataset with added action detection annotations. The VIRAT dataset contains 64 videos (2.47 hours) for training and 54 videos (1.93 hours) for validation, with annotations for 40 different activities involving people and vehicles. The MEVA dataset [1] consists of 1,056 annotated videos, each 5 minutes long, covering both indoor and outdoor scenes. 936 of these videos were used for training, and of the remaining 120 videos, 50 were used for validation and 70 were used for local evaluation. These videos are annotated with 37 different activities, mainly involving humans and vehicles. These annotations follow long-tail distribution, resulting in few activities including many annotated instances as they occur very frequently, and resulting in many activities including very few instances as they are rare. For the final testing, the system was submitted to an evaluation server where a set of sequestered videos are used for evaluation of the system.

The videos for both datasets are high resolution, so the videos are rescaled to a lower resolution of 800×448, while maintaining the aspect ratio, to reduce computational requirements on the system. The localization network uses a stack of 16 frames to obtain the binary segmentation masks; the ground-truth for these masks is the bounding box annotations for all actions present within the given frames (regions within the bounding boxes are considered foreground and other regions are considered background). The network is trained using the SGD dataset [26] with a learning rate of $1e^{-3}$ for approximately 100,000 iterations. For the BCE+PDL training, the values of $\lambda_1$ and $\lambda_2$ were set to 1. The classification model was trained with a clip length of 16 frames having a skip rate of 1, thereby obtaining clips of 1 second each, and a spatial-resolution of 112×112. For the classifier, the ADAM optimizer [18] was used with a learning rate of $1e^{-4}$ for 75,000 iterations.

To increase the diversity of data, the method pre-processes the videos that are input to the network during training. For the localization network, the method applies frame jitter and cropping to simulate the shaking of a camera to mimic environmental conditions, such as wind. For the classification network, the method performs cropping, resizing, and horizontal flipping on the input tubes. Moreover, both ground-truth and predicted (outputs of the localization network) tubes are used for the training of the classifier. One of the challenging issues with both the VIRAT and MEVA datasets is data imbalance. To balance the data, the method under-samples the classes with largest number of samples. Also, multi-scale cropping and horizontal flipping is performed on classes with the fewest number of samples. Lastly, frame reversal is performed to generate new clips for complementary pairs of classes such as (Opening, Closing), (Loading, Unloading), (Entering, Exiting), and (Open_Trunk, Close_Trunk) to increase the number of samples for these classes.

The method was evaluated using several metrics, including the following: the probability of missed detection at fixed rate of false alarm per minute ($P_{miss}@R_{FA}$); the probability of missed detection at fixed time-based false alarm per minute ($P_{miss}@T_{FA}$); and the partial area under the Detection Error Tradeoff curve (AUDC). These metrics measure the quality of action detections for the action detection task. To calculate these metrics, a one-to-one correspondence is found between the ground-truth actions and the detected actions; ground-truth actions without a corresponding detection are missed detections, while detections without corresponding ground-truth actions are false alarms. For ablations of the classification network, the method uses standard multi-label classification metrics: precision, recall, and F1-score.

Results

As shown in Table 1 below, the method's performance on classifying the VIRAT dataset outperformed other classification attempts on $P_{miss@0.15}T_{FA}$ and $P_{miss@0.15}R_{FA}$ metrics; compared to the closest comparable method, MUDSML, the methods described herein achieved similar results (within 0.7%) with respect to AUDC, but a 9.5% improvement in terms of $P_{miss@0.15}R_{FA}$ was noted.

TABLE 1

Temporal localization results on the VIRAT test set

| Team | $P_{miss@0.15}T_{FA}$ | $P_{miss@0.15}R_{FA}$ | AUDC |
|---|---|---|---|
| Fraunhofer | 0.7747 | 0.8474 | 0.8270 |
| vireoJD-MM | 0.5482 | 0.7284 | 0.6012 |
| NTT_CQUPT | 0.5112 | 0.8725 | 0.6005 |
| Hitachi | 0.5099 | 0.8240 | 0.5988 |
| BUPT-MCPRL | 0.4328 | 0.7491 | 0.5240 |
| MUDSML [20] | 0.3915 | 0.7979 | 0.4840 |
| This Method | 0.3858 | 0.7022 | 0.4909 |

In addition, as shown in Table 2 below, the method's performance on classifying the MEVA dataset outperformed the other classification attempts, improving AUDC by over 3.5% and $P_{miss@0.04}T_{FA}$ by over 2%, without the need of pre-trained object detectors for localization or optical flow for classification.

TABLE 2

Temporal localization results on the MEVA test set

| Team | $P_{miss@0.15}T_{FA}$ | AUDC | Processing Time |
|---|---|---|---|
| Team-Vision | 0.776 | 0.717 | 0.793 |
| IBM-MIT-Purdue | 0.733 | 0.641 | 0.272 |
| Edge-Intelligence | 0.754 | 0.628 | 0.939 |
| INF | 0.559 | 0.489 | 0.646 |
| UMD [9] | 0.544 | 0.475 | 0.725 |
| This Method | 0.523 | 0.438 | 0.362 |

Figure 4:
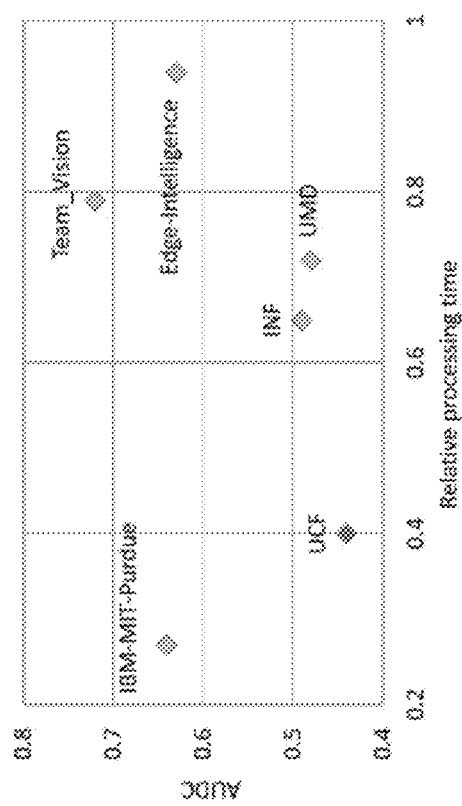
FIG. 4 is a graphical depiction of a comparison of the partial area under the detection error tradeoff curve (AUDC) between the methods described herein and prior art classification methods.

As shown in FIG. 4, relating to the MEVA dataset, the method outperformed most other systems by a wide margin in terms of speed and performance, achieving 45 frames per second (fps) on a single GPU. The difference in speed is due to the localization network, since the network directly generates tubelets instead of relying on per-frame object detections for proposal generation. This greatly reduces the number of action proposals and allows for the efficient processing of videos online.

Moreover, several ablations were run to evaluate the effectiveness of the Patch-Dice Loss, with the results shown below in Table 3. Using PDL during training leads to an improvement in the localization network, mainly due to the increase in number of correct detections. Although the regular dice loss improves localizations when compared to standard BCE, it was found that the network does not correctly localize the very small activities. By using PDL during training, the network correctly localizes more of these activities which leads to an overall improvement in the AUDC score.

TABLE 3

Ablation Experiments of Patch-Dice Loss on Localization Network

| Model | IoU |
|---|---|
| BCE | 62.27% |
| BCE + Dice Loss | 62.35% |
| BCE + PDL (This Method) | 63.43% |

Furthermore, to determine the best network architecture, multiple classification models were tested that were initialized with pre-trained weights on the Kinetics [17] that were trained on the same settings. The comparison based on the VIRAT dataset is shown in Table 4, using an average F1-Score as a metric for comparison; it was noted that the R(2+1)D model [32] outperforms the other models.

TABLE 4

Ablation experiments for different classification network architectures. Precision, recall, and F1-scores are averaged over all classes on VIRAT validation set

| Architecture | Precision | Recall | F1-Score |
|---|---|---|---|
| I3D [3] | 0.36 | 0.31 | 0.33 |
| P3D [24] | 0.43 | 0.41 | 0.41 |
| 3D-ResNet [12] | 0.46 | 0.43 | 0.44 |
| R(2 + 1)D [32] | 0.50 | 0.43 | 0.45 |

Figure 5:
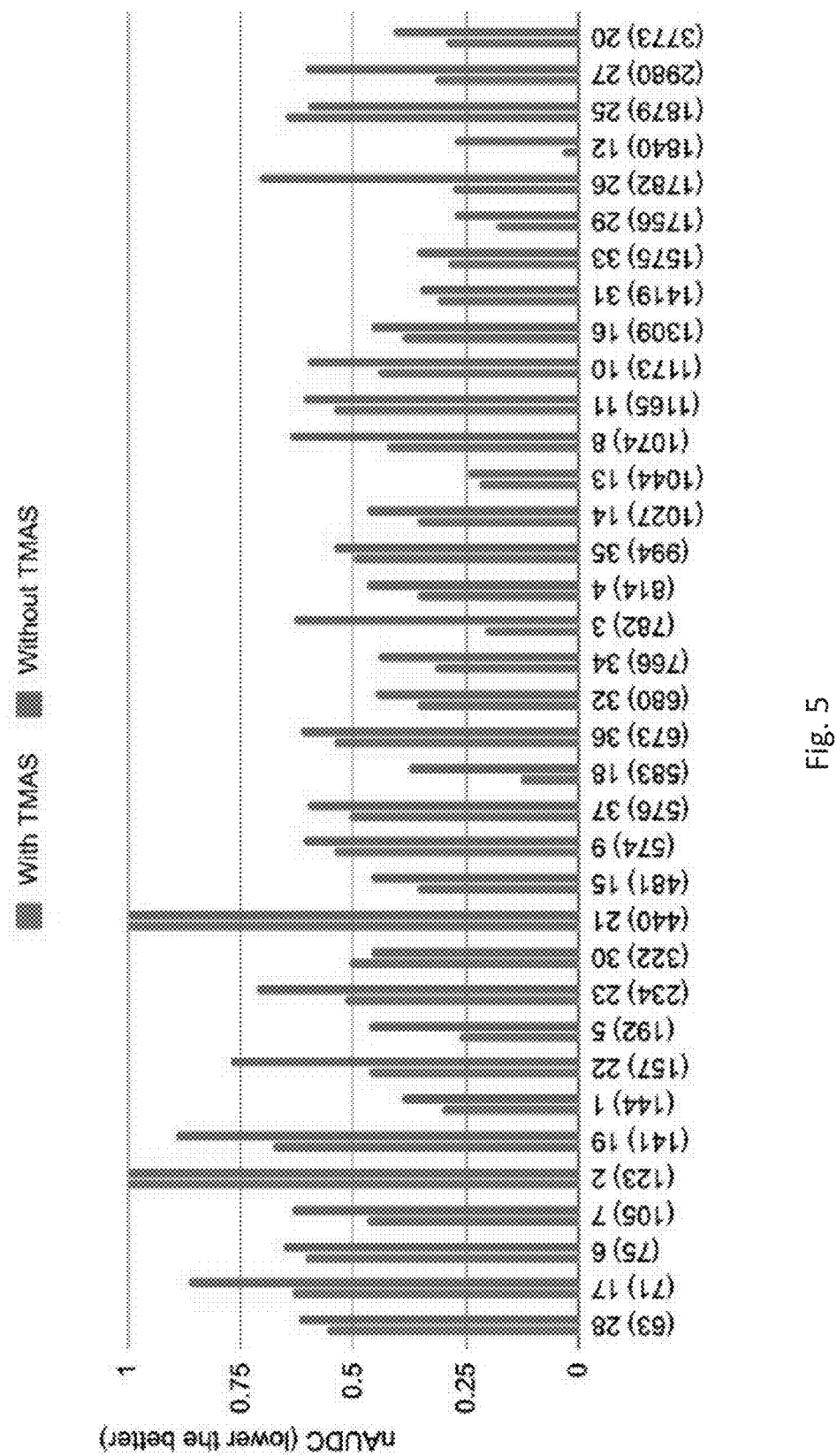
FIG. 5 is a graphical depiction of AUDC scores associated with experimental results of the methods described herein, depicting a comparison between classifications using the two-step process shown in FIGS. 3A-3B with classifications without using the two-step process.

The final step of the system is the two-step calculation described above and is critical for the method's success. To show the impact of this step in the overall performance, the per-class n-AUDC scores were compared with and without the two-step TMAS algorithm on the local evaluation set of the MEVA dataset, as shown in FIG. 5. With the post-processing step, it was observed that the scores improved for the activity classes which occurred for a longer temporal span, such as 'person reads document' (20) and 'person texts on phone' (24).

CONCLUSION

Figure 6A:
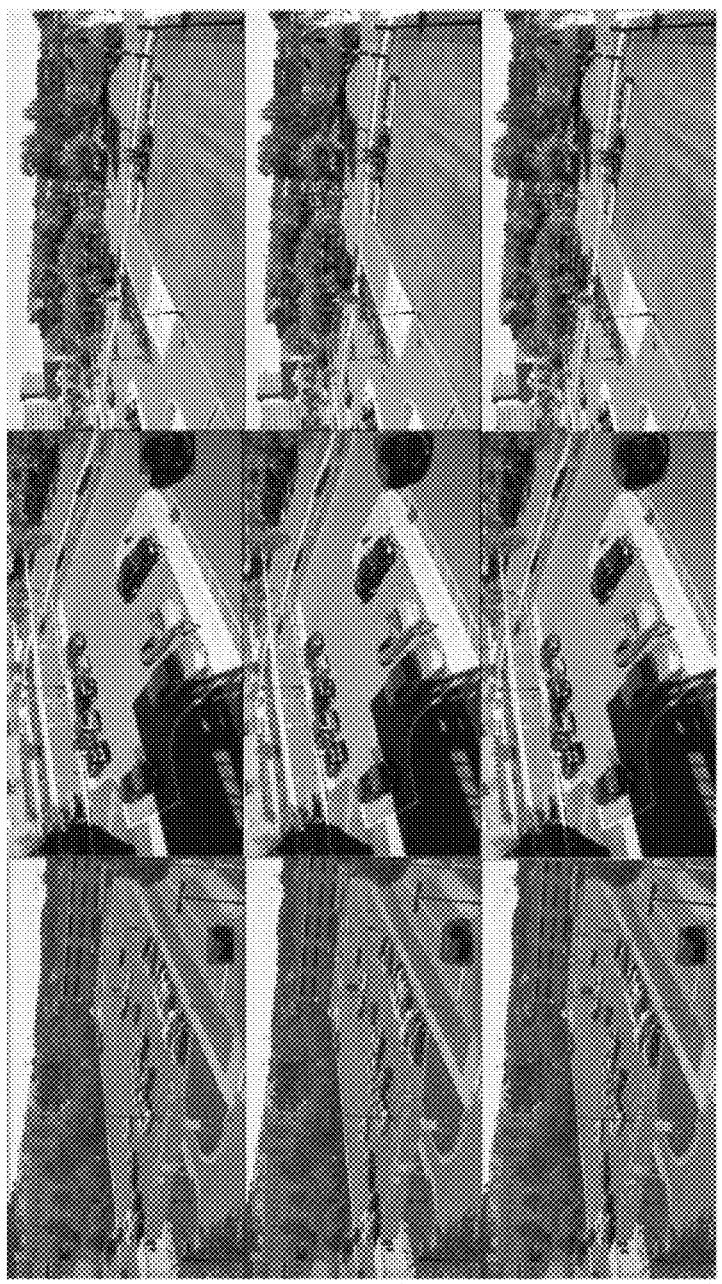
FIG. 6A depicts qualitative experimental results associated with the methods described herein, showing different portions of video segments highlighted through classifications of the segments.
Figure 6B:
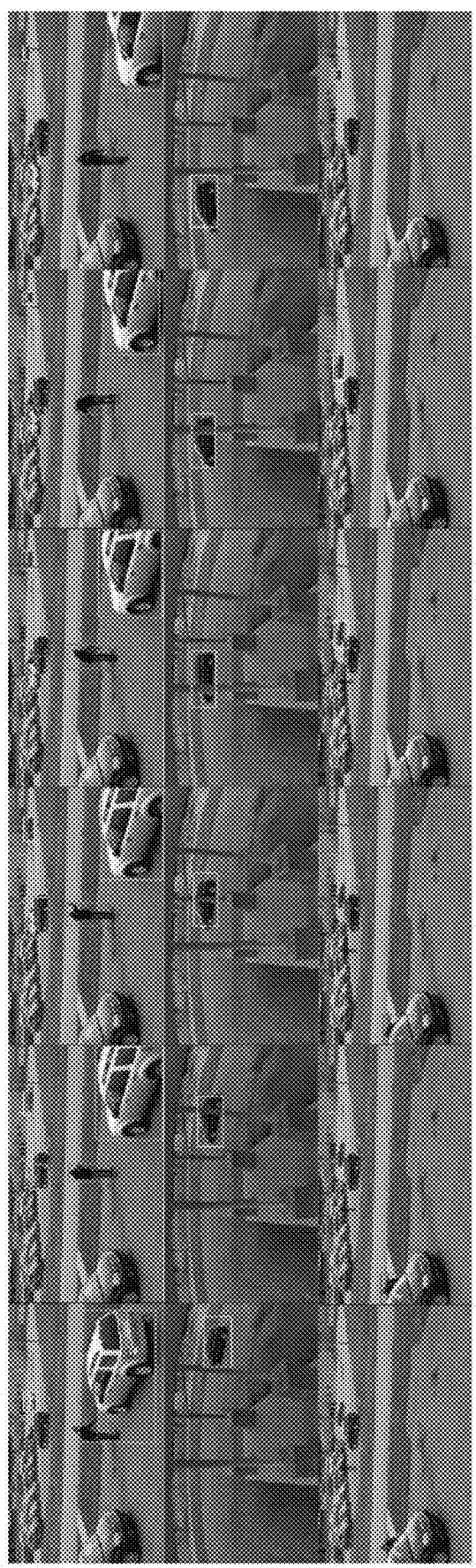
FIG. 6B depicts qualitative experimental results associated with the methods described herein, showing different portions of video segments analyzed over time highlighted through classifications of the segments.

As shown in FIGS. 6A-6B, qualitative results show that the system performs well on different viewpoints, action scales, and action types. The method is able to detect activities involving multiple actors, as well as activities involving interactions between a person and a vehicle. Since the method does not rely on frame-based object detection, fewer detections are produced, and the method avoids objects that are not involved in an activity. As such, the method's outputs result in a drastic reduction in computing power used to classify non-actions, like stationary vehicles, thereby efficiently classifying actions within untrimmed video segments.

Moreover, the system can be implemented as an online action detection system, since the system processes a stream of input frames by performing localization, classification, and temporal segmentation of activities with little or no delay. This is in contrast to other systems [10, 20] that are restricted to offline detection, since they rely on object detection for every frame in the video, requiring access to future frames to generate tube proposals.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

REFERENCES

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

[1] Kitware inc, the multiview extended video with activities (meva) dataset.
[2] Trecvid 2019 actev: Activities in extended video.
[3] J. Carreira and A. Zisserman. Quo vadis, action recognition? a new model and the kinetics dataset. In proceedings of the IEEE Conference on Computer Vision and Pattern Recognition, pages 6299-6308, 2017.
[4] L.-C. Chen, G. Papandreou, F. Schroff, and H. Adam. Rethinking atrous convolution for semantic image segmentation. arXiv preprint arXiv:1706.05587, 2017.
[5] L.-C. Chen, Y. Zhu, G. Papandreou, F. Schroff, and H. Adam. Encoder-decoder with atrous separable convolution for semantic image segmentation. In Proceedings of the European conference on computer vision (ECCV), pages 801-818, 2018.
[6] K. Duarte, Y. Rawat, and M. Shah. Videocapsulenet: A simplified network for action detection. In Advances in Neural Information Processing Systems, pages 7610-7619, 2018.
[7] C. Feichtenhofer, H. Fan, J. Malik, and K. He. Slowfast networks for video recognition, 2018.
[8] C. Fiorio and J. Gustedt. Two Linear Time Union-Find Strategies for Image Processing. Theoretical Computer Science, 154(2):165-181, 1996.
[9] J. Gleason, C. D. Castillo, and R. Chellappa. Real-time detection of activities in untrimmed videos. In Proceedings of the IEEE Winter Conference on Applications of Computer Vision Workshops, pages 117-125, 2020.
[10] J. Gleason, R. Ranjan, S. Schwarcz, C., Castillo, J.-C. Chen, and R. Chellappa. A proposal-based solution to spatio-temporal action detection in untrimmed videos. In 2019 IEEE Winter Conference on Applications of Computer Vision (WACV), pages 141-150. IEEE, 2019.
[11] C. Gu, C. Sun, D. A. Ross, C. Vondrick, C. Pantofaru, Y. Li, S. Vijayanarasimhan, G. Toderici, S. Ricco, R. Sukthankar, et al. Ava: A video dataset of spatio-temporally localized atomic visual actions. In Proceedings of the IEEE Conference on Computer Vision and Pattern Recognition, pages 6047-6056, 2018.

[12] K. Hara, H. Kataoka, and Y. Satoh. Can spatiotemporal 3d cnns retrace the history of 2d cnns and imagenet? In Proceedings of the IEEE Conference on Computer Vision and Pattern Recognition (CVPR), pages 6546-6555, 2018.

[13] R. Hou, C. Chen, and M. Shah. An end-to-end 3d convolutional neural network for action detection and segmentation in videos. arXiv preprint arXiv:1712.01111, 2017.

[14] H. Idrees, A. R. Zamir, Y.-G. Jiang, A. Gorban, I. Laptev, R. Sukthankar, and M. Shah. The thumos challenge on action recognition for videos "in the wild". Computer Vision and Image Understanding, 155:1-23, 2017.

[15] V. Kalogeiton, P. Weinzaepfel, V. Ferrari, and C. Schmid. Action tubelet detector for spatio-temporal action localization. In Proceedings of the IEEE International Conference on Computer Vision, pages 4405-4413, 2017.

[16] A. Karpathy, G. Toderici, S. Shetty, T. Leung, R. Sukthankar, and L. Fei-Fei. Large-scale video classification with convolutional neural networks. In Proceedings of the 2014 IEEE Conference on Computer Vision and Pattern Recognition, CVPR '14, pages 1725-1732, Washington, D.C., USA, 2014. IEEE Computer Society.

[17] W. Kay, J. Carreira, K. Simonyan, B. Zhang, C. Hillier, S. Vijayanarasimhan, F. Viola, T. Green, T. Back, P. Natsev, et al. The kinetics human action video dataset. arXiv preprint arXiv:1705.06950, 2017.

[18] D. P. Kingma and J. Ba. Adam: A method for stochastic optimization. arXiv preprint arXiv:1412.6980, 2014.

[19] A. Kirillov, R. Girshick, K. He, and P. Dollar. Panoptic feature pyramid networks. In Proceedings of the IEEE Conference on Computer Vision and Pattern Recognition, pages 6399-6408, 2019.

[20] W. Liu, G. Kang, P.-Y. Huang, X. Chang, Y. Qian, J. Liang, L. Gui, J. Wen, and P. Chen. Argus: Efficient activity detection system for extended video analysis. In Proceedings of the IEEE Winter Conference on Applications of Computer Vision Workshops, pages 126-133, 2020.

[21] S. Oh, A. Hoogs, A. Perera, N. Cuntoor, C.-C. Chen, J. T. Lee, S. Mukherjee, J. Aggarwal, H. Lee, L. Davis, et al. A large-scale benchmark dataset for event recognition in surveillance video. In CVPR 2011, pages 3153-3160. IEEE, 2011.

[22] X. Peng and C. Schmid. Multi-region two-stream r-cnn for action detection. In European conference on computer vision, pages 744-759. Springer, 2016.

[23] A. J. Piergiovanni and M. S. Ryoo. Temporal gaussian mixture layer for videos. In Proceedings of the 36th International Conference on Machine Learning, ICML 2019, 9-15 Jun. 2019, Long Beach, Calif., USA, pages 5152-5161, 2019.

[24] Z. Qiu, T. Yao, and T. Mei. Learning spatio-temporal representation with pseudo-3d residual networks. In proceedings of the IEEE International Conference on Computer Vision, pages 5533-5541, 2017.

[25] S. Ren, K. He, R. Girshick, and J. Sun. Faster r-cnn: Towards real-time object detection with region proposal networks. In Advances in neural information processing systems, pages 91-99, 2015.

[26] H. Robbins and S. Monro. A stochastic approximation method. The annals of mathematical statistics, pages 400-407, 1951.

[27] O. Ronneberger, P. Fischer, and T. Brox. U-net: Convolutional networks for biomedical image segmentation. In Medical Image Computing and Computer-Assisted Intervention (MICCAI), volume 9351 of LNCS, pages 234-241. Springer, 2015.

[28] K. Simonyan and A. Zisserman. Two-stream convolutional networks for action recognition in videos. In Z. Ghahramani, M. Welling, C. Cortes, N. D. Lawrence, and K. Q. Weinberger, editors, Advances in Neural Information Processing Systems 27, pages 568-576. Curran Associates, Inc., 2014.

[29] G. Singh, S. Saha, M. Sapienza, P. H. Torr, and F. Cuzzolin. Online real-time multiple spatiotemporal action localisation and prediction. In Proceedings of the IEEE International Conference on Computer Vision, pages 3637-3646, 2017.

[30] C. H. Sudre, W. Li, T. Vercauteren, S. Ourselin, and M. J. Cardoso. Generalised dice overlap as a deep learning loss function for highly unbalanced segmentations. In Deep learning in medical image analysis and multimodal learning for clinical decision support, pages 240-248. Springer, 2017.

[31] D. Tran, L. Bourdev, R. Fergus, L. Torresani, and M. Paluri. Learning spatiotemporal features with 3d convolutional networks. In The IEEE International Conference on Computer Vision (ICCV), December 2015.

[32] D. Tran, H. Wang, L. Torresani, J. Ray, Y. LeCun, and M. Paluri. A closer look at spatiotemporal convolutions for action recognition. In Proceedings of the IEEE conference on Computer Vision and Pattern Recognition, pages 6450-6459, 2018.

[33] K. Wu, E. Otoo, and A. Shoshani. Optimizing connected component labeling algorithms. In J. M. Fitzpatrick and J. M. Reinhardt, editors, Medical Imaging 2005: Image Processing, volume 5747, pages 1965-1976. International Society for Optics and Photonics, SPIE, 2005.

[34] Z. Yang, J. Gao, and R. Nevatia. Spatio-temporal action detection with cascade proposal and location anticipation. arXiv preprint arXiv:1708.00042, 2017.

[35] S. Yeung, O. Russakovsky, N. Jin, M. Andriluka, G. Mori, and L. Fei-Fei. Every moment counts: Dense detailed labeling of actions in complex videos. International Journal of Computer Vision, 2017.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of detecting and categorizing a plurality of activities from an untrimmed video segment, the method comprising the steps of:

receiving an untrimmed video segment including a plurality of subsequent frames, the untrimmed video segment including one or more activities depicted therein;

splitting the untrimmed video segment into a plurality of video clips, each of the plurality of video clips including at least one of the plurality of subsequent frames;

for each of the plurality of video clips, localizing, via a localization network, each of the one or more activities depicted in the video clip by placing a bounding box over each of the one or more activities in a first of the plurality of subsequent frames and tracking the bounding box across a remainder of the plurality of subsequent frames, such that one or more bounding boxes are generated;

after performing the localization for each of the plurality of video clips, outputting, for each of the plurality of video clips, a segmentation mask by assigning, for each pixel of each of the plurality of subsequent frames, a probability of depicting the one or more activities, the probability based on a location of the pixel to the one or more bounding boxes;

based on the segmentation mask, calculating, for each of the plurality of video clips, a foreground-background confidence mask that differentiates between the one or more activities and a background, wherein the step of calculating the foreground-background confidence mask comprises the steps of:

calculating a binary cross-entropy loss for each pixel of each of the plurality of subsequent frames;

calculating a patch-dice loss by splitting each of the plurality of subsequent frames into a plurality of local neighborhoods based on a position grid and computing a dice loss for each of the plurality of local neighborhoods; and calculating a weighted sum of the binary cross-entropy loss and the patch-dice loss, wherein the probability of depicting the one or more activities is based on a location of the pixel to the one or more bounding boxes on the position grid;

extracting, based on the foreground-background confidence mask, a plurality of candidate tubelets that correlate with the one or more bounding boxes; and simultaneously filtering and combining the plurality of candidate tubelets into an output of action-specific tubes, each action-specific tube including a portion of the plurality of candidate tubelets and being greater in length then each of the plurality of candidate tubelets, by:

merging the plurality of candidate tubelets into a set of action-agnostic tubes that are discrete based on an overlap on a position grad with one of the one or more bounding boxes across the plurality of subsequent frames; and splitting the set of action-agnostic tubes into a set of actions-specific tubes by classifying each of the one or more activities contained within each action-agnostic tube.

2. The method of claim 1, wherein the step of merging the plurality of candidate tubelets into the set of action-agnostic tubes further comprises creating a new action-agnostic tube based on a determination that one of the plurality of candidate tubelets does not overlap with any remaining candidate tubelets on the position grid.

3. The method of claim 1, wherein the step of merging the plurality of candidate tubelets into the set of action-agnostic tubes further comprises merging one of the plurality of candidate tubelets with one action-agnostic tube based on a determination that the one of the plurality of candidate tubelets overlaps with the action-agnostic tube on the position grid.

4. The method of claim 1, wherein the step of merging the plurality of candidate tubelets into the set of action-agnostic tubes further comprises creating a new action-agnostic tube based on a determination that one of the plurality of candidate tubelets overlaps with two or more discrete tubelets of the plurality of candidate tubelets.

5. The method of claim 1, wherein the step of merging the plurality of candidate tubelets into the set of action-agnostic tubes further comprises merging, based on a determination that two or more of the plurality of candidate tubelets overlaps with one action-agnostic tube, the candidate tubelet having a higher overlap with the action-agnostic tube on the position grid, and creating a new action-agnostic tube based on the other candidate tubelet of the plurality of candidate tubelets.

6. The method of claim 1, further comprising the step of outputting, based on the weighted sum of the binary cross-entropy loss and the patch-dice loss, a foreground-background confidence mask that differentiates between the one or more activities and a background.

7. The method of claim 1, further comprising the step of capturing, via a recording device having a storage medium associated therewith, the untrimmed video segment including the plurality of subsequent frames.

8. The method of claim 1, wherein the step of localizing each of the one or more activities depicted in the video clip further comprises stacking, via a decoder of an encoder-decoder structure, a plurality of feature pyramids from layers of the decoder to obtain feature representations at each layer, thereby localizing each of the one or more activities at different scales across the plurality of subsequent frames.

9. A method of detecting and categorizing a plurality of activities from an untrimmed video segment, the method comprising the steps of:

capturing, via a recording device having a storage medium associated therewith, an untrimmed video segment including a plurality of subsequent frames, the untrimmed video segment including one or more activities depicted therein;

receiving, via a remote computing device including a processor and a non-transitory storage medium, the untrimmed video segment from the recording device, such that the untrimmed video segment is stored on the non-transitory storage medium;

splitting, via the processor of the remote computing device, the untrimmed video segment into a plurality of video clips, each of the plurality of video clips including at least one of the plurality of subsequent frames;

for each of the plurality of video clips, localizing, via a localization network executable on the remote computing device, each of the one or more activities depicted in the video clip by placing a bounding box over each of the one or more activities in a first of the plurality of subsequent frames and tracking the bounding box across a remainder of the plurality of subsequent frames, such that one or more bounding boxes are generated;

after performing the localization for each of the plurality of video clips, outputting, for each of the plurality of video clips, a segmentation mask by assigning, for each pixel of each of the plurality of subsequent frames, a probability of depicting the one or more activities, the probability based on a location of the pixel to the one or more bounding boxes;

based on the segmentation mask, calculating, via the remote computing device, for each of the plurality of video clips, a foreground-background confidence mask that differentiates between the one or more activities and a background, wherein the step of calculating the foreground-background confidence mask comprises the steps of:

calculating a binary cross-entropy loss for each pixel of each of the plurality of subsequent frames;

calculating a patch-dice loss by splitting each of the plurality of subsequent frames into a plurality of local neighborhoods based on a position grid and computing a dice loss for each of the plurality of local neighborhoods; and calculating a weighted sum of the binary cross-entropy loss and the patch-dice loss; wherein the probability of depicting the one or more activities is based on a location of the pixel to the one or more bounding boxes on the position grid;

extracting, based on the foreground-background confidence mask, a plurality of candidate tubelets that correlate with the one or more bounding boxes; and simultaneously filtering and combining the plurality of candidate tubelets into an output of action-specific tubes, each action-specific tube including a portion of the plurality of candidate tubelets and being greater in length then each of the plurality of candidate tubelets, by:

merging the plurality of candidate tubelets into a set of action-agnostic tubes that are discrete based on an overlapping grid position of one of the one or more bounding boxes across the plurality of subsequent frames; and splitting the set of action-agnostic tubes into a set of actions-specific tubes by classifying each of the one or more activities contained within each action-agnostic tube.

10. The method of claim 9, wherein the step of merging the plurality of candidate tubelets into the set of action-agnostic tubes further comprises creating a new action-agnostic tube based on a determination that one of the plurality of candidate tubelets does not overlap with any remaining candidate tubelets on the position grid.

11. The method of claim 9, wherein the step of merging the plurality of candidate tubelets into the set of action-agnostic tubes further comprises merging one of the plurality of candidate tubelets with one action-agnostic tube based on a determination that the one of the plurality of candidate tubelets overlaps with the action-agnostic tube on the position grid.

12. The method of claim 9, wherein the step of merging the plurality of candidate tubelets into the set of action-agnostic tubes further comprises creating a new action-agnostic tube based on a determination that one of the plurality of candidate tubelets overlaps with two or more discrete tubelets of the plurality of candidate tubelets.

13. The method of claim 9, wherein the step of merging the plurality of candidate tubelets into the set of action-agnostic tubes further comprises merging, based on a determination that two or more of the plurality of candidate tubelets overlaps with one action-agnostic tube, the candidate tubelet having a higher overlap with the action-agnostic tube on the position grid, and creating a new action-agnostic tube based on the other candidate tubelet of the plurality of candidate tubelets.

14. The method of claim 9, further comprising the step of outputting, based on the weighted sum of the binary cross-entropy loss and the patch-dice loss, a foreground-background confidence mask that differentiates between the one or more activities and a background.

15. The method of claim 9, wherein the step of localizing each of the one or more activities depicted in the video clip further comprises stacking, via a decoder of an encoder-decoder structure, a plurality of feature pyramids from layers of the decoder to obtain feature representations at each layer, thereby localizing each of the one or more activities at different scales across the plurality of subsequent frames.

16. A method of detecting and categorizing a plurality of activities from an untrimmed video segment, the method comprising the steps of:

localizing, via a localization network, each of one or more activities depicted in the untrimmed video segment having a plurality of subsequent frames by placing a bounding box over each of the one or more activities in a first of the plurality of subsequent frames and tracking the bounding box across a remainder of the plurality of subsequent frames, such that one or more bounding boxes are generated;

after performing the localization for each of the plurality of video clips, outputting a segmentation mask by assigning, for each pixel of each of the plurality of subsequent frames, a probability of depicting the one or more activities by:

calculating a binary cross-entropy loss for each pixel of each of the plurality of subsequent frames;

calculating a patch-dice loss by splitting each of the plurality of subsequent frames into a plurality of local neighborhoods based on a position grid and computing a dice loss for each of the plurality of local neighborhoods;

calculating a weighted sum of the binary cross-entropy loss and the patch-dice loss; and outputting, based on the weighted sum of the binary cross-entropy loss and the patch-dice loss, a foreground-background confidence mask that differentiates between the one or more activities and a background, wherein the probability of depicting the one or more activities is based on a location of the pixel to the one or more bounding boxes on the position grid;

extracting, based on the foreground-background confidence mask, a plurality of candidate tubelets that correlate with the one or more bounding boxes; and simultaneously filtering and combining the plurality of candidate tubelets into an output of action-specific tubes, each action-specific tube including a portion of the plurality of candidate tubelets and being greater in length then each of the plurality of candidate tubelets, by:

creating a set of action-agnostic tubes from the plurality of candidate tubelets by:

creating a new action-agnostic tube based on a determination that one of the plurality of candidate tubelets does not overlap with any remaining candidate tubelets on the position grid;

merging one of the plurality of candidate tubelets with an action-agnostic tube based on a determination that the one of the plurality of candidate tubelets overlaps with the action-agnostic tube on the position grid;

creating a new action-agnostic tube based on a determination that one of the plurality of candidate tubelets overlaps with two or more discrete tubelets of the plurality of candidate tubelets; and based on a determination that two or more of the plurality of candidate tubelets overlaps with an action-agnostic tube, merging the candidate tubelet having a higher overlap with the action-agnostic tube on the position grid, and creating a new action-agnostic tube based on the other candidate tubelet of the plurality of candidate tubelets, wherein the set of action-agnostic tubes are discrete based on an overlapping grid position of one of the one or more bounding boxes across the plurality of subsequent frames; and splitting the set of action-agnostic tubes into a set of actions-specific tubes by classifying each of the one or more activities contained within each action-agnostic tube.

17. The method of claim 16, further comprising the step of, prior to localizing each of one or more activities depicted in the untrimmed video segment, splitting the untrimmed video segment into a plurality of video clips, each of the plurality of video clips including at least one of the plurality of subsequent frames, such that the localization steps are performed for each of the plurality of video clips.

18. The method of claim 16, further comprising the step of wherein the step of localizing each of the one or more activities depicted in the untrimmed video segment further comprises stacking, via a decoder of an encoder-decoder structure, a plurality of feature pyramids from layers of the decoder to obtain feature representations at each layer, thereby localizing each of the one or more activities at different scales across the plurality of subsequent frames.

\* \* \* \* \*